United States Patent Office 3,462,785
Patented Aug. 26, 1969

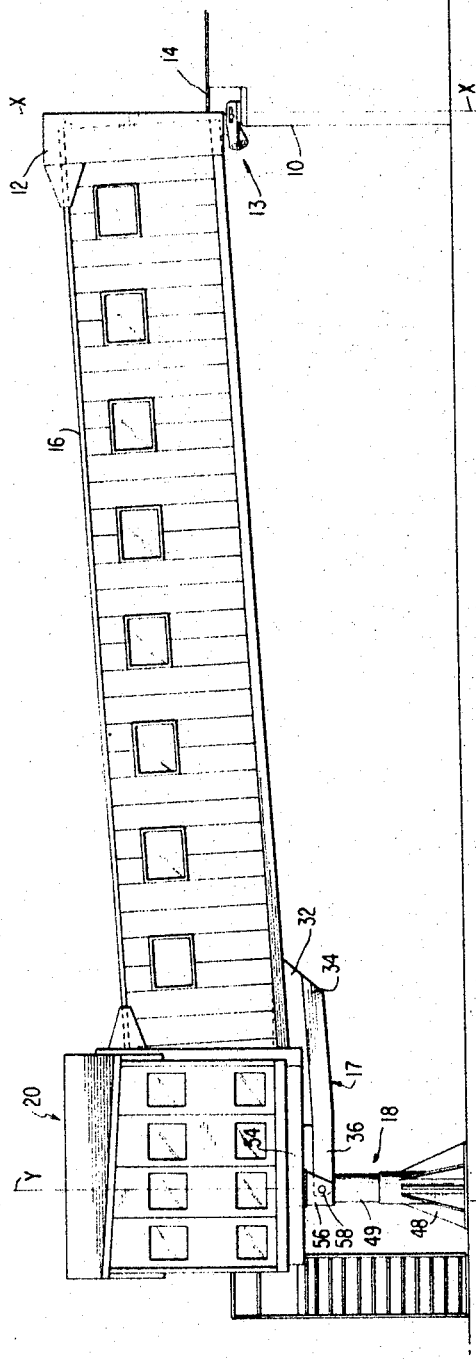
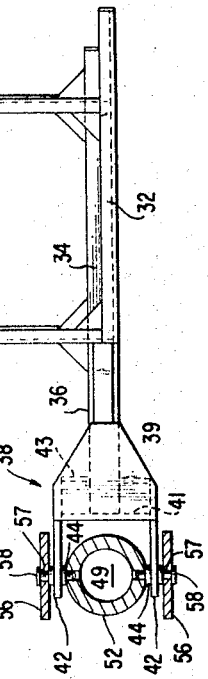
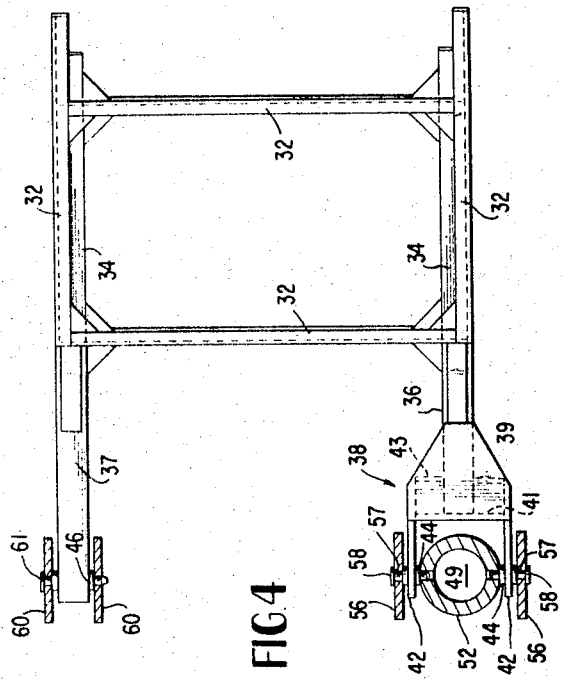
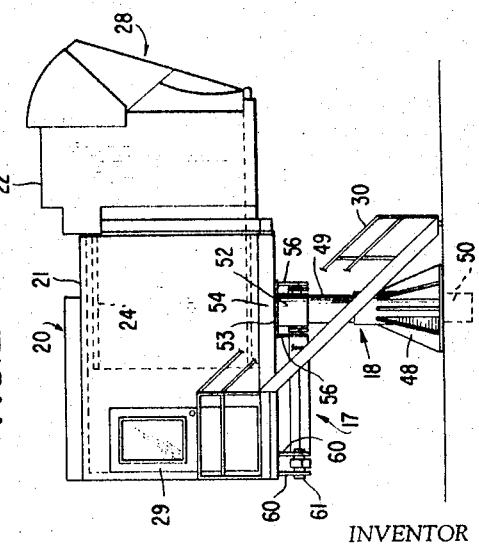
INVENTOR
ANDREW G. SEIPOS
BY Shanley & O'Neil
ATTORNEYS

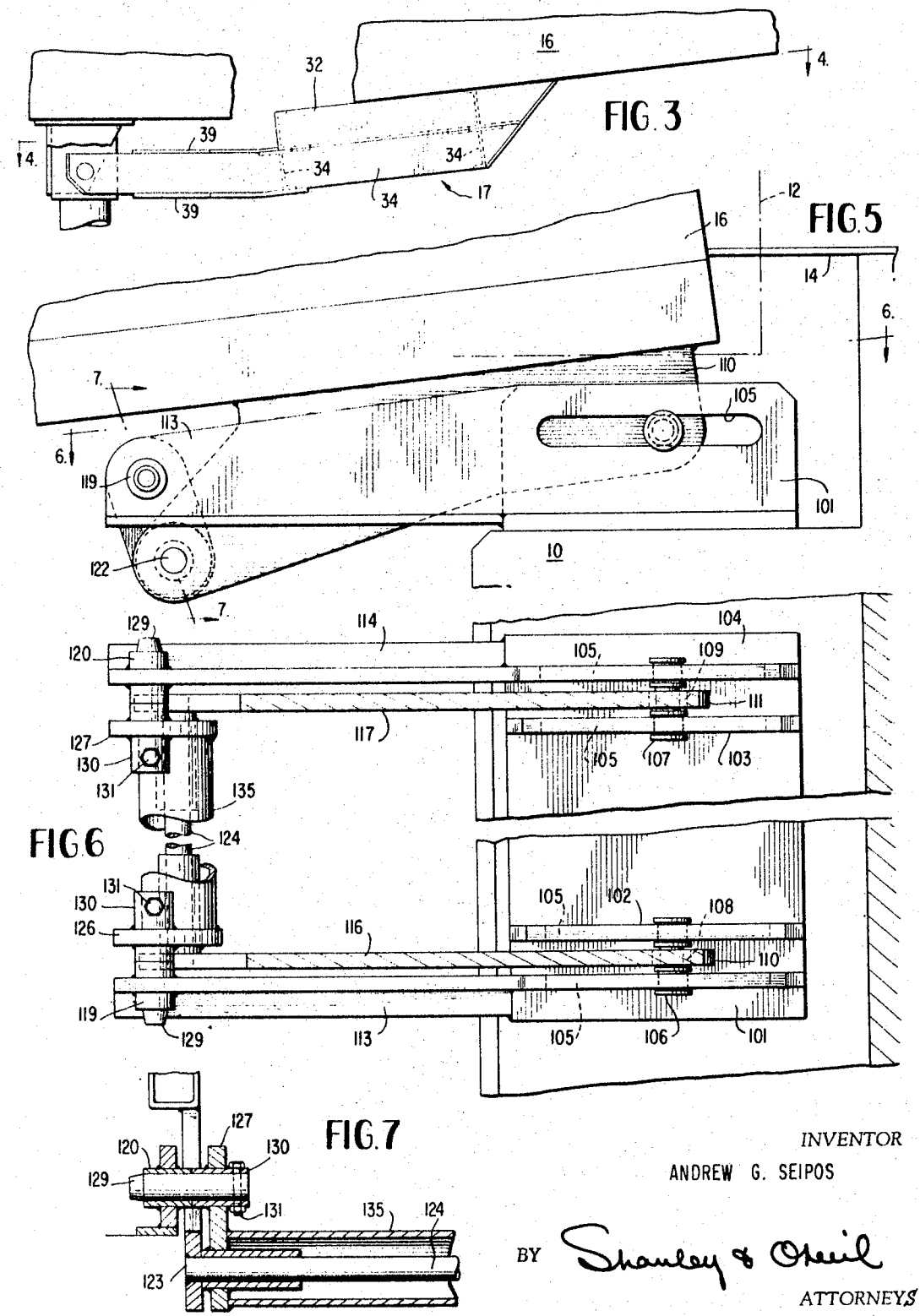

1

3,462,785
CONVEYANCE LOADER
Andrew G. Seipos, Miami, Fla., assignor, by mesne assignments, to Wollard Aircraft Equipment Inc., Miami, Fla., a corporation of Washington
Continuation-in-part of application Ser. No. 469,546, July 6, 1965. This application Aug. 24, 1967, Ser. No. 662,988
Int. Cl. B65g *11/14, 69/28*
U.S. Cl. 14—71                    8 Claims

ABSTRACT OF THE DISCLOSURE

A conveyance loader having a terminal building portion, a connecting passageway portion mounted for vertical swinging movement at the terminal portion, a conveyance end portion supported at a single point on an elevating mechanism which is movable in a straight vertical line, pivotal connections at each end of the connecting passageway portion between the terminal building portion and the conveyance end portion, the pivotal connections serving to brace the conveyance end portion against rotation around the single point of support on elevating mechanism while permitting longitudinal movement of the connecting passageway portion relative to one of the pivotal connections to accommodate the vertical swinging movement of the connecting passageway portion and the straight line vertical movement of the elevating mechanism.

A specific compact associated with the said one pivotal connection of a passageway portion for accommodating the vertial swinging movement of this passageway portion to the straight line vertical movement of the elevating mechanism.

Cross references to related applications

This application is a continuation-in-part of pending application Ser. No. 469,546, filed July 6, 1965 by Joseph C. Wollard, John S. Slaney and Andrew G. Seipos now Patent No. 3,378,868.

The present application also relates to structures of the type disclosed in pending patent application Ser. No. 619,483, filed Feb. 28, 1967, by Joseph C. Wollard, John S. Slaney and Lester L. Preiss, now Patent No. 3,341,875, which application was in turn a continuation of application Ser. No. 357,358, filed Apr. 6, 1964, and now abandoned.

Background of the invention

The type of conveyance loader illustrated in Patent No. 3,341,875 has a horizontally adjustable conveyance end portion which is supported on a pair of elevating mechanisms. In this manner, that part of the conveyance end portion which projects toward the conveyance takes its major point of support from one elevating mechanism while the connecting passageway to the terminal building is pivoted to the other end of the conveyance end portion and the weight of this part of the loader derives its principal point of support from the other elevating mechanism. Additionally, the two mechanisms brace the conveyance end portion against rotation as the loader goes up and down and as the connecting passageway portion exerts a lateral thrust action on its end of the conveyance end portion.

The present invention eliminates the need for a plurality of elevating mechanisms by supporting the connecting passageway portion on specially designed structure at the conveyance end portion and by the utilization of a specific form of the generic invention of Patent No. 3,378,868 at either one of the two pivot points of the connecting passageway which eliminates substantially all thrust by the connecting passageway against the conveyance end portion during up and down movement of the loader.

Brief description of the drawings

FIGURE 1 is a view in side elevation of a preferred embodiment of the present invention, FIGURE 2 is a view in end elevation of the structure shown in FIGURE 1 with parts broken away for clarity, FIGURE 3 is an enlarged fragmentary view in side elevation of the supporting structure at one end of the connecting passageway portion, FIGURE 4 is an enlarged fragmentary view in horizontal section on the line 4—4 of FIGURE 3, FIGURE 5 is an enlarged fragmentary view in side elevation of the sliding pivot structure at one end of the connecting passageway portion, FIGURE 6 is an enlarged fragmentary view taken in section on the line 6—6 of FIGURE 5, and FIGURE 7 is an enlarged fragmentary (far side) view taken on the line 7—7 of FIGURE 5.

Description of the preferred embodiments

In the drawings a terminal building component is diagrammatically illustrated at 10 and rigidly supported in any suitable manner (not shown) on terminal building component 10 is a terminal end portion 12 of the loader forming a passageway into the loader. A floor portion of the terminal building component, diagrammatically illustrated at 14, extends into portion 12 of the loader for providing a continuous walkway in any suitable manner between the building component and the interior of the conveyance loader.

Pivotally supported by the building component 10 on a special rolling pivot structure indicated generally at 13, to be specifically described, is an elongated connecting passageway means or tunnel portion 16 of the loader, the outer end of which is supported by structure indicated generally at 17 for vertical movement by an elevating mechanism indicated generally at 18. Also supported on elevating mechanism 18 is a conveyance end portion indicated generally at 20 which includes a short passageway or tunnel portion 21. A conveyance or airplane engaging vestibule 22 is carried by a passageway or tunnel portion 24 telescopingly received within short passageway or tunnel 21 of the conveyance end portion 20 so that vestibule 22 can move toward and away from an airplane. Vestibule 22 can also be pivotally mounted for limited swinging movement in a horizontal line relative to the fuselage of an airplane and suitable fuselage engaging structure indicated generally at 28 is provided for making weathertight engagement therewith.

A door 29 and outside stairway 30 are provided for access between the conveyance end of the loader and the apron for the convenience of flight and ground personnel.

As illustrated in FIGURES 3 and 4, support structure 17 for the outer end of connecting tunnel portion 16 is made up of a rectangular reinforcing framework 32 rigidly mounted on the outer end of connecting tunnel portion 16, framework 32 carrying on its underside another rectangular frame 34, the side members of which extend longitudinally to provide arms 36 and 37. Arm 36 carries at its outer end a bifurcated structure indicated generally at 38 which is built onto and forms an extension of arm 36. Bifurcated structure 38 is made up of top and bottom plates 39 connected to the top and bottom of arm 36 and a diaphragm plate 41 connected to the end of arm 36 and to the top and bottom plates 39. Extension plates 42 are rigidly connected to the ends of diaphragm plate 41 and the opposed faces of plates 39. The fixed ends of extension plates 42 are braced by a pair of duplicate plates 43 which are rigidly connected to arm 36 and the opposed faces of plates 39. The outer portions of extension plates 42 carry a pair of coaxially aligned bearing elements 44.

Arm 37 carries at its outer end a bearing element 46 which is coaxially disposed relative to bearing elements 44.

Elevating mechanism 18 is made up of a ground supported base 48 which supports in vertical position a hydraulic cylinder and piston mechanism which is diagrammatically illustrated at 49 with a portion 50 extending underground to accommodate the desired degree of vertical movement of the piston. Carried on the upper end of the piston is a collar 52 and a fixed plate 53, the fixed plate 53 being rigidly connected to the supporting framework 54 of conveyance end portion 20 of the loader. The supporting framework 54 has depending therefrom a pair of hangers 57 having in their lower end portions axially aligned openings 57 for the reception of bearing pins 58. For greater strength, bearing pins 58 can project into axially aligned openings in collar 52. As shown in FIGURE 4, bearing elements 44 rotatably receive pins 58.

In the vicinity of the end portion of arm 37, framework 54 carries a pair of hangers 60, the lower end portions of which have axially aligned openings which receive a pin 61. Bearing element 46 on the end portion of arm 37 rotatably receives pin 61.

It will be evident that the weight of outer end of connecting tunnel portion 16 of the loader is carried by elevating mechanism 18, with arm 36 transmitting the weight to supporting framework 54 of conveyance end portion 20 at the point of connection with the elevating mechanism and arm 37 transmitting a portion of the weight to the outer end portion of framework 54. Elevating mechanism is therefore positioned relative to conveyance end portion 20 so as to carry the conveyance end portion, including conveyance vestibule 22, together with the movable end of connecting tunnel portion 16 with the least maximum strain on supporting framework 54.

Since elevating mechanism 18 moves up and down in a vertical line with no lateral support other than base 48 and since the vertical swinging movement of connecting tunnel portion 16 will tend to impose lateral thrust forces on elevating mechanism 18 and the tortional force on elevating mechanism 18 by lateral force exerted on pin 61, applicant has provided means at 13 for nullifying any such lateral thrust action on the part of midportion 16. This applicant has accomplished by utilizing the rolling pivot and cooperating link arm arrangement specifically disclosed in patent No. 3,378,868.

Referring now to FIGURES 5, 6 and 7, a modification of the invention covered by the copending application is disclosed. Since with conveyance loaders which do not have a horizontal swinging movement the structure at the terminal building end of the loader can be simplified, so also can the rolling pivot and coordinated linkage system disclosed in FIGURES 1 to 7, inclusive, of the copending patent application.

Mounted on terminal building component 10 on each side of and spaced from the longitudinal axis of the connecting tunnel portion 16 are a pair of rolling pivot support members 101, 102 and 103, 104, respectively, each of which incorporates identically shaped slots 105, with the ends of a rolling pivot 106 positioned in the slots 105 of one pair of supports and the ends of a rolling pivot 107 positioned in the slots 105 of the other support. The center portions of rolling pivots 106 and 107 are rotatingly received in bearing members 108 and 109, respectively, carried by structural plates 110 and 111, respectively, carried by connecting tunnel portion 16. Thus, rolling pivot support members 101 and 102 form elongated bearing surfaces defined by the lower sides of slots 105 on which rolling pivot 106 can roll by virtue of being journaled in bearing 108, thereby supporting the terminal building end of tunnel portion 16 for both pivoted movement and movement in the direction of the longitudinal axis of tunnel portion 16 in respect to building component 10. Corresponding bearing surfaces 105 are presented by rolling pivot support members 103 and 104 for cooperating with corresponding rolling pivot 107, bearing 109 and structural plate 111.

Rolling pivot support members 101 and 104 carry integral structural extensions 113, 114 and pivot bearing support plates 110 and 111 carry integral structural extensions 116, 117. The outermost portions of structural extensions 113, 114 carry coaxial linkage pivot bearings 119 and 120, respectively, and structural extensions 116, 117 carry coaxial linkage pivot bearings 122 and 123 which may be the end portions of a continuous cylindrical rod 124. In the embodiment illustrated, structural extensions 113, 114, 116, 117 are shaped so that they cross each other, thereby positioning coaxial linkage pivot bearings 122 and 123 at a greater distance from tunnel portion 16 than coaxial linkage pivot bearing members 119 and 120.

The purposes of structural extensions 113, 114, 116 and 117 is to provide the pivot bearing members for a linkage system which will cause controlled rolling movement of rolling pivots 106 and 107 on the bearing surface of slots 105 in response to up and down movement of the conveyance end of connecting tunnel portion 16. Thus, structural extensions 113 and 116 are connected by a rigid link member 126 and structural extensions 114 and 117 are connected by a link member 127. Each end of link members 126 and 127 incorporates a complementary pivot bearing structure to cooperate with the pivot bearing structures 119 and 120 in respect to the link member 126 and pivot bearing members 120 and 123 in respect to link member 127. The pivot bearing structure of link member 127 which cooperates with pivot bearing means 120 is fixed pivot pin 129 fixedly held in sleeve 130 by bolt and nut 131, sleeve 130 being fixedly held in link member 127 (see FIGURE 7). Identical structure is repeated for cooperation of link member 126 with pivot bearing 119 and identical reference numerals have been applied to these corresponding parts.

It will be apparent that with proper shaping and dimensioning of the structural extensions and links and resulting proper location of the linkage pivots, as more specifically described in Patent No. 3,378,868 vertical swinging movement of connecting tunnel portion 16 around pivots 106, 107 will, acting through the linkage systems, cause controlled rolling movement of these same pivots on the bearing surfaces of slots 105. This controlled movement of rolling pivots 106 and 107 is designed to compensate for the arc which coaxial pivot points 58 and 61 would tend to follow if it were not for the linkage system of the present invention so as to maintain constant the distance between a fixed vertical plane X—X passing through the terminal end portion 12 of the loader and a plane Y—Y passing through coaxial pivot points 58 and 61. Thus, no objectionable lateral force is exerted against elevating mechanism 18 by vertical swinging movement of the connecting passageway portion 16.

Since conveyance end portion 20 of the loader is supported at a single point on elevating mechanism 18, the structure at the conveyance end presents little resistance against rotation of the conveyance end portion around the elevating mechanism. It therefore becomes important to confine a movement of elongated tunnel portion 16 to movement parallel to a vertical plane which includes the single point of support of conveyance end portion 20 and which is parallel to or includes the longitudinal axis of the tunnel portion 16. This is accomplished at rolling pivot structure 13 by means of torque tube 135. With the links 126 and 127 in alignment as set up by use rod 124 and with rolling pivots 106 and 107 in coaxial relation, torque tube 135 is welded at its ends to the respective links 126 and 127. Thereafter rotational movement of link 127 on pivot pin 129 causes an identical rotational movement of link 126 on its pin 129. Although torque tube 135 can be omitted where the loader is adequately braced against lateral movement at the end of the loader remote from the linkage system, it is a very desirable and advantageous feature of the linkage system.

Although the conveyance end portion 20 of the loader is shown angularly disposed relative to the connecting tunnel portion, it can obviously extend in the same direction, i.e., away from the terminal building. In such case the pivots 58 and 61 would be equally spaced on each side of the elevating mechanism 18.

Although the invention has been described in connection with a preferred embodiment and subcombination, modifications of the preferred embodiment and subcombination can be made without departing from the invention as defined by the appended claims.

I claim:
1. A conveyance loader comprising:
   (a) a fixed terminal passageway means having support means,
   (b) an elongated tunnel means having a terminal end with an opening and an outer end with an opening forming a passageway,
   (c) means interconnecting the fixed terminal passageway means and the terminal end of the elongated tunnel means for vertical swinging movement of the elongated tunnel means relative to the fixed terminal passageway means,
   (d) a single ground supported elevating means mounted for vertical movement in a straight line,
   (e) horizontal support means mounted on the ground supported elevating mechanism, the ground supported elevating means constituting the sole support for the horizontal support means,
   (f) a horizontally disposed relatively short tunnel means carried by the horizontal support means, having an end with an opening facing in the direction of a conveyance,
   (g) means forming a second opening in the end portion of the short tunnel means removed from the conveyance end, the second opening being in registry with the opening in the outer end of the elongated tunnel means,
   (h) means connecting the outer end of the elongated tunnel means and the horizontal support means for vertical swinging movement of the elongated tunnel means relative to the horizontal support means,
   (i) conveyance engaging means carried by the conveyance end of the short tunnel means,
   (j) one of means (c) and (h) including a plurality of fixed coaxial pivot means, at least one on each side of the longitudinal axis of the elongated tunnel means,
   (k) the other of means (c) and (h) including a plurality of movable coaxial pivot means,
   (l) means associated with the pivot means of (k) providing for movement of the pivot means of (k) in the direction of the longitudinal axis of the elongated tunnel means,
   (m) linking means,
   (n) connecting means associated with the linking means (m) for connecting the linking means to an immovable point relative to the associated support means (a) or (e), and
   (o) means spaced from the connecting means (n) associated with linking means (m) for connecting the linking means to the elongated tunnel means,
   (p) the location of connecting means (n) and (o) relative to each other and to pivot means (k) being such as to cause linking means (m) to constrain the pivot means (k) to controlled horizontal movement relative to said one of the supporting means in response to upward and downward movement of the conveyance end of the passageway means to eliminate lateral thrust against ground supported elevating means (d) by the elongated tunnel section (b) during vertical swinging movement of the outer end of the elongated tunnel means.

2. The conveyance loader of claim 1 in which the short tunnel means (f) extends in one direction laterally of the longitudinal axis of the elongated tunnel means, at least one of the coaxial pivot means of (j) or (k) is located contiguous to a vertical line passing through the single ground supported elevating means and another fixed coaxial pivot means of (j) or (k) is located in spaced relation to said vertical line on the side of the longitudinal axis of the elongated tunnel means away from the short tunnel lateral extension.

3. A conveyance loader comprising:
   (a) means forming an elongated passageway having a terminal end and a conveyance end,
   (b) first supporting means for supporting the terminal end of the passageway means at a constant vertical elevation,
   (c) a second supporting means for supporting the conveyance end of the passageway means for upward and downward movement of the conveyance end relative to the level of the terminal end,
   (d) pivot bearing means and coacting elongated bearing surface means mounting the passageway means on one of the supporting means for limited movement in the direction of the longitudinal dimension of the passageway means,
   (e) an integral structural extension carried by each of the pivot bearing means and the elongated bearing surface means but otherwise independent of the passageway means and the one supporting means, the structural extensions extending in the direction of the other supporting means, each structural extension having an outer end portion spaced from the associated pivot bearing means and from the associated elongated bearing surface means in the direction of the other supporting means,
   (f) linkage pivot means carried by the outer end portion of each structural extension, and
   (g) rigid linking means connecting the two linkage pivot means,
   (h) the length of the linking means, the proportioning of the structural extensions and the distance between each linkage pivot means and the associated pivot bearing means or associated elongated bearing surface means acting to connect the passageway means and said one of the supporting means for causing controlled relative movement between the pivot bearing means and the coacting elongated bearing surface means in response to upward and downward movement of the conveyance end of the passageway means to maintain a fixed point on the conveyance end of the loader at a constant distance from a fixed vertical reference line passing through the first supporting means during upward and downward movement of the conveyance end of the passageway means.

4. The conveyance loader claimed in claim 3 in which the linkage pivot means carried by the structural extension associated with the pivot bearing means are located in greater spaced relation from the part of the loader carrying the pivot bearing means than the linkage pivot means carried by the structural extension associated with the bearing surface means are spaced from the part of the loader carrying the pivot bearing means.

5. A conveyance loader comprising:
   (a) means forming an elongated passageway having a terminal end, a conveyance end and a longitudinal axis extending from end to end,
   (b) first supporting means for supporting the terminal end of the passageway means at a constant vertical elevation, (c) second supporting means for supporting the conveyance end of the passageway means for upward and downward movement of the conveyance end relative to the level of the terminal end, (d) bearing support means carried by the passageway means and bearing support means carried by one of the supporting means, (e) coplanar bearing surface means carried by one of the bearing support means, the coplanar bearing surface means being elongated in the direction of the longitudinal axis of the passageway means, a bearing surface means being located on each side of and spaced from a vertical plane including the longitudinal axis of the passageway, (f) coaxial pivot bearing members carried by the other bearing support means, a pivot bearing member being movably engaged with each elongated bearing surface, (g) an integral structural extension carried by each bearing support means but otherwise independent of the passageway means and the one supporting means, the structural extensions extending in the direction of the other supporting means, each structural extension having an outer end portion spaced away from the associated bearing surfaces and the associated pivot bearing members in the direction of the other supporting means, (h) coaxial linkage pivot means mounted on the outer end portions of the structural extensions carried by the one bearing support means, (i) coaxial linkage pivot means mounted on the outer end portions of the structural extensions carried by the other bearing support means, and (j) rigid linking means connecting the coaxial linkage pivot means of limitation (h) with the coaxial linkage pivot means of limitation (i), (k) the length of the linking means, the proportioning of the structural extensions and the distance between each coaxial linkage pivot means and the associated pivot bearing support means acting to connect the passageway means and said one of the supporting means for causing controlled relative movement between the coaxial pivot bearing members and the coplanar elongated bearing surface means in response to upward and downward movement of the conveyance end of the passageway means to maintain a fixed point on the conveyance end of the loader at a constant distance from a fixed vertical reference line passing through the first supporting means during upward and downward movement of the conveyance end of the passageway means.

6. The conveyance claimed in claim 5 in which the coaxial linkage pivot means of limitation (i) are located in greater spaced relation from the part of the loader carrying the pivot bearing members of limitation (f) than the coaxial linkage pivot bearing means of limitation (h) are spaced from the part of the loader carrying the pivot bearing members of limitation (f).

7. The conveyance loader claimed in claim 5 in which coupling means act between linking means (j) constraining them to identical movement.

8. The conveyance loader claimed in claim 6 in which coupling means act between linking means (j) constraining them to identical movement.

References Cited

UNITED STATES PATENTS

| 3,262,254 | 11/1963 | Wollard et al. | 14—71 |
| 3,358,308 | 12/1967 | Henchbarger | 14—71 |
| 3,378,868 | 4/1968 | Wollard et al. | 14—71 |

JACOB L. NACKENOFF, Primary Examiner